United States Patent
Qu et al.

(10) Patent No.: US 7,161,361 B2
(45) Date of Patent: Jan. 9, 2007

(54) DEVICE AND METHOD FOR MEASURING CAPACITANCE AND DEVICE FOR DETERMINING THE LEVEL OF A LIQUID USING ONE SUCH DEVICE

(75) Inventors: Wenmin Qu, St. Ingbert (DE); Julien Frederic Gamel, Betting-les-Saint-Avold (FR); Horst Mannebach, Munstermaifeld (DE); Leo Mathias Jirgal, Saarbrucken (DE)

(73) Assignee: Hydac Electronic GmbH., Saarbrücken (DE)

( * ) Notice: Subject to any disclaimer, the term of this patent is extended or adjusted under 35 U.S.C. 154(b) by 0 days.

(21) Appl. No.: 10/533,119

(22) PCT Filed: Oct. 16, 2003

(86) PCT No.: PCT/EP03/11449

§ 371 (c)(1),
(2), (4) Date: Apr. 29, 2005

(87) PCT Pub. No.: WO2004/057281

PCT Pub. Date: Jul. 8, 2004

(65) Prior Publication Data

US 2005/0280424 A1 Dec. 22, 2005

(30) Foreign Application Priority Data

Dec. 19, 2002 (DE) ............................... 102 61 767

(51) Int. Cl.
*G01R 27/26* (2006.01)
*G01F 23/26* (2006.01)

(52) U.S. Cl. ..................... 324/690; 324/686; 73/304 C

(58) Field of Classification Search ................ 324/690, 324/663; 73/304 C
See application file for complete search history.

(56) References Cited

U.S. PATENT DOCUMENTS 4,003,259 A   1/1977   Hope
6,101,873 A   8/2000   Kawakatsu et al.

FOREIGN PATENT DOCUMENTS

DE   100 15 306 A 1   10/2001

OTHER PUBLICATIONS

Mohr et al.; A New Method for Self-Calibrating Capitive Sensor; IEEE Instrumentation and Measurement Technology Conference, Budapest, May 2001, pp. 454-459.
Toth et al; A new capacitive presision liquid-level sensor; Conference on Precision Electromagnetic Measurements Digest, Jun. 1996, pp. 356-357.

*Primary Examiner*—Andrew H. Hirshfeld
*Assistant Examiner*—Timothy J. Dole
(74) *Attorney, Agent, or Firm*—Roylance,Abrams,Berdo & Goodman, L.L.P.

(57) ABSTRACT

A device (5) measures capacity, and includes an electrode arrangement with a plurality of electrodes (E1, E2, ..., En) which are adjacently and/or successively arranged on a carrier (6). An intrinsic measuring device (8) measures the capacitance between a first electrode (E2), in the form of a measuring electrode, and a second electrode (E1), in the form of a counter-electrode. A controllable switching device (7) connects the electrodes (E1, E2, ..., En), in the form of first and second electrodes (E2, E1), to the measuring device (8) in such a way that they can be switched in a pre-determinable manner. Each electrode (E1, E2, ..., En) of the electrode arrangement can be switched in a controlled, alternate manner by the switching device (7), in the form of a measuring electrode, and respectively at least one of the other electrodes (E1, E2, ..., En), in the form of a counter-electrode, can be switched to a pre-determinable reference potential. An associate method and a device (1) determine the level (2) of a liquid (3) using one such device (5).

19 Claims, 3 Drawing Sheets

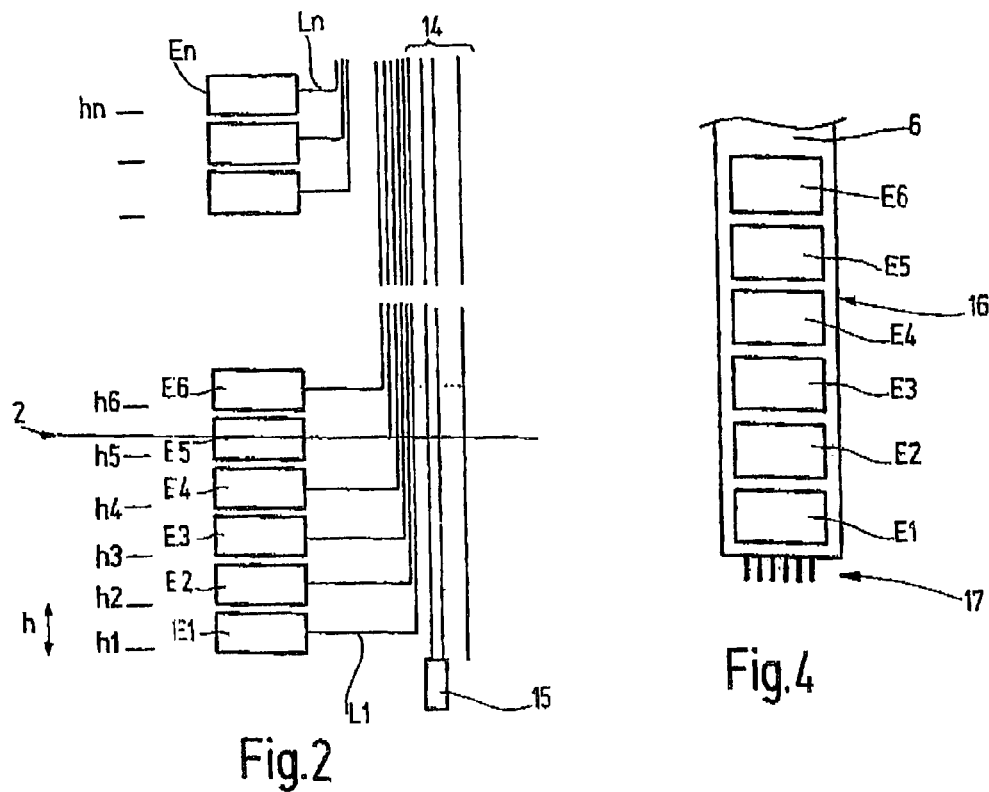
Fig.2
Fig.4
FIG. 3:
x- axis  level
y- axis  electrode capacitance against ground in pF
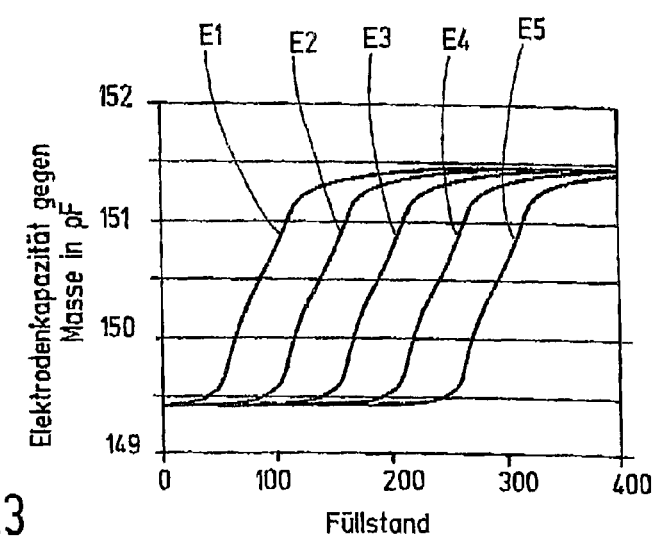
Fig.3

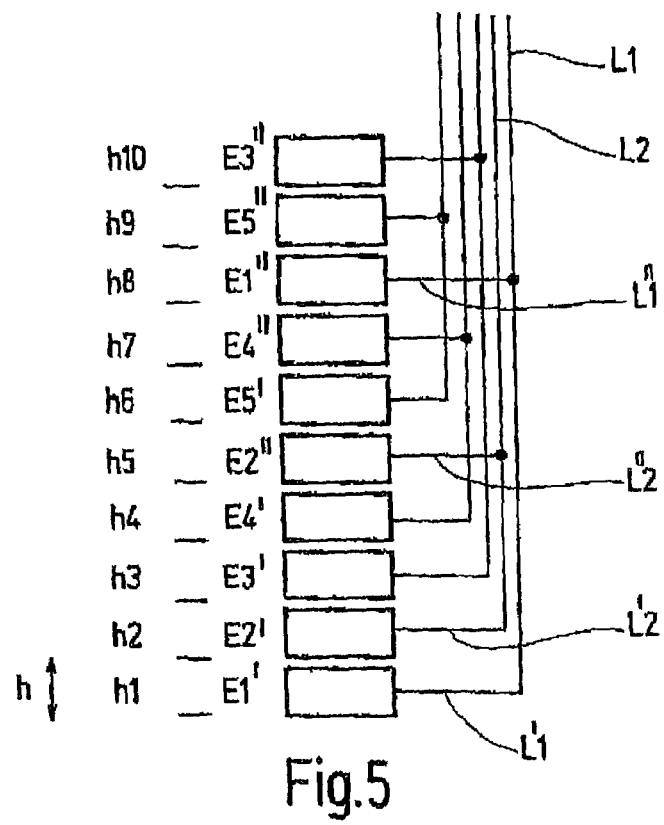
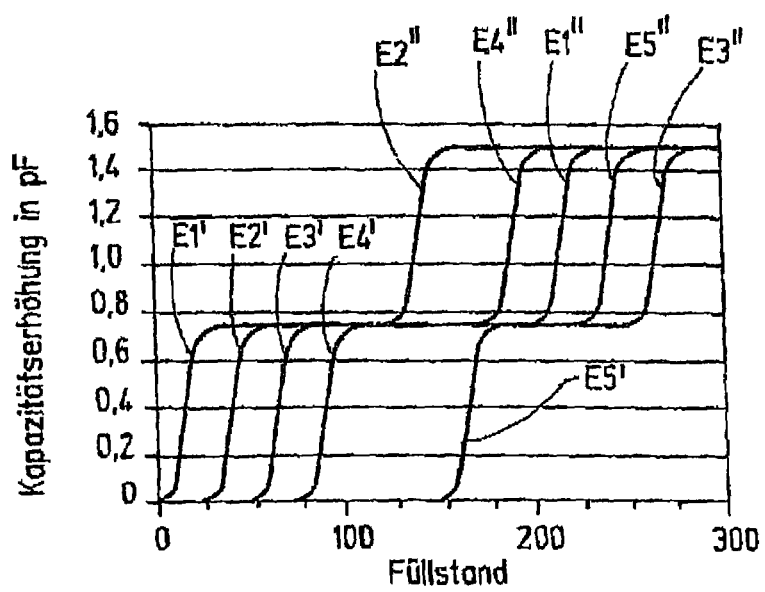
FIG. 6 :
x-axis level
y-axis capacitance increase in pF

DEVICE AND METHOD FOR MEASURING CAPACITANCE AND DEVICE FOR DETERMINING THE LEVEL OF A LIQUID USING ONE SUCH DEVICE

FIELD OF THE INVENTION

The present invention relates to device for measuring capacitance with a plurality of electrodes mounted on a support located next to one another or in succession, and a corresponding method and a device for determining the level of a liquid using such device.

BACKGROUND OF THE INVENTION

The prior art, for example, the publication of TOTH, F. N. et al.: A new capacitive precision liquid-level sensor, Digest 1996 Conference on Precision Electromagnetic Measurements, Braunschweig, discloses generic devices. Elongated "guard" and reference potential ("$E_0$") electrodes are located parallel to a series of successive measurement electrodes adjacently on one side or both sides. The capacitance, and thus, ultimately the level are measured by measuring the capacitance between the individual measurement electrodes and the opposing elongated reference potential electrode.

These devices necessitate high complexity of interconnection, and thus, high production and installation costs. In addition, special precautions must be taken to achieve high resolution with low sensitivity to noise signals.

SUMMARY OF THE INVENTION

An object of the present invention is to provide an improved device, process and corresponding means for determining the level of a liquid in a container. Other objects of the device of the present invention are to be especially economical to produce and install, and to be continuously reliable in operation. Resolution and (in)sensitivity to noise signals are to be further optimized.

These objects are basically achieved in a device for capacitance measurement with an electrode arrangement having a plurality of electrodes located next to one another and/or in succession on a support. An actual measurement means measures the capacitance between a first electrode as the measurement electrode and a second electrode as the counterelectrode. A controllable switching means connects the electrodes as the first and second electrodes to the measurement means, which connection can be switched in a definable manner. In being controlled by the switching means, each electrode of the electrode arrangement can be switched in alternation as the measurement electrode. At least one of the other electrodes can thereby be switched as the counterelectrode to a definable reference potential.

Preferably, the electrodes are located on a surface area, especially on a planar surface. In one special embodiment, the electrodes are located next to one another with their longitudinal sides in a rectangle shape. The distance of the electrodes is preferably as small as possible, especially less than half, and preferably less than ⅕ of the distance from one electrode to the next. For many applications, it is advantageous to arrange the electrodes on a flexible support, for example, on a film of polymer plastic such as, for example, polyimide. The use of materials with a low temperature coefficient of their dielectric constant, such as, for example, polypropylene, is especially advantageous for the flexible support and/or for a tube which optionally encloses the support.

The electrode support is preferably fixed or pressed with the electrodes into stable contact with the inner side of the tube. For example, the electrode support can be clamped onto an internal tube which is elastically deformable and which is inserted into the tube. The internal tube can be filled, especially foamed, for mechanical stabilization.

The tube, on its side facing the liquid, can be provided at least partially, preferably over its entire surface area, with a coating. As a result of the material chosen for the coating, for example, a high beading effect of the liquid is caused, and therefore, reduces wetting with the liquid, and/or prevents diffusion of the liquid into the tube. These coatings may contain, for example, a polymer plastic, and can be applied to the tube by painting or by an immersion bath.

Preferably, the electrodes are not only electrically insulated against one another, but are covered with an electrically insulating layer on the side facing away from the support. It is advantageous if the electrodes together with the connecting printed conductors are applied to the support in thin or thick film technology. Application can take place in a structured manner, for example, by screen printing or stamping. Alternatively or in addition, application can also take place over the entire surface area. Then, the surface layer can be structured, for example, using photolithographic structuring processes, such as are known, for example, from semiconductor technology or hybrid microcircuit technology.

In one special embodiment, the device has a connecting means for electrical connection of other sensors and/or for connection to the switching means. The connection of other sensors and/or of the switching means takes place preferably detachably and/or, if necessary, sealed relative to the surrounding liquids.

Sensors may be provided which do not require direct contact with the liquids, for example, a temperature sensor. In this case, the sensor can be located within the tube, for example, on the electrode support, and can make direct electrical contact with the printed conductors present there.

Alternatively or in addition, sensors may be provided which are to be brought into direct contact with the liquid, for example, a viscosity sensor. In this case, the sensor must be located outside of the tube. Electrical connection takes place by way of an electrical penetration in the tube that is impervious to fluids, especially on its bottom. Preferably, there is a detachable plug connection.

Other sensors can be, for example, sensors for humidity, pressure or the like. An additional capacitive sensor with which a medium surrounds the device is examined with respect to its dielectric constant. Preferably, the connecting printed conductors for the additional sensors are also mounted on the support of the device.

Furthermore, there can also be at least parts of the controllable switching means or the measurement means on the support of the device. As a rule, it is also possible to use as the support for the electrode arrangement the same substrate as is used for the switching means and/or the measurement means. The degree of integration of components ultimately depends on the respective application, as well as the requirements for the size of the device for which there can be lower and/or upper limits dictated by the function of the device.

In one special embodiment of the present invention, the definable reference potential is the ground potential of the measurement means. In this way, the capacitance values of the switched electrodes can be measured especially easily in terms of circuitry and at the same time with a high degree of precision.

Preferably, the so-called "charge-transfer" process is used for the measurement means. Conventional values of the capacitance to be measured, for example, when using the device of the present invention as a level sensor, are in the range of fractions of a pF to a few hundred pF. Such values can also be greater or smaller depending on the medium, especially its dielectric constant, and/or the electrode surface areas and electrode distances.

Preferably, all electrodes not switched as measurement electrodes are switched to the reference potential, to the ground potential in particular. In the case of a level sensor, it is moreover advantageous to switch the liquid and/or at least one part of the wall of the container to this or another definable reference potential.

All electrodes preferably have an essentially identical contour and surface area. Preferably, all electrodes are arranged essentially equidistantly relative to one another and/or to the connecting lines. This arrangement yields not only simplified production of the device, but the measured capacitance values and capacitance changes are also fundamentally of the same order of magnitude. When switching through in alternation, it is moreover advantageous that the reliability of the device is increased due to the fact that the electrodes are identical. Moreover, the elongated reference potential electrode with a large surface area is not necessary in the present invention. Such lacking requirement clearly reduces the surface area required by the electrode arrangement, or the electrodes can be larger with the same required surface area, whereby the measurement sensitivity and/or the measurement accuracy is increased.

To increase the measurement accuracy at a given overall size of the device, it is also possible for several electrodes, which are preferably not directly adjacent, to be interconnected hard-wired into one respective electrode group. Each electrode group is alternately switched as a measurement electrode. At least one of the other respective electrode groups is switched as the counterelectrode to the definable reference potential by the switching device. This arrangement corresponds to dividing the individual electrodes into different component segments. The hard-wired interconnection of the electrodes into the respective electrode group takes place preferably at the location of the connecting lines, especially at the height of the pertinent electrode, so that the demand for space is not increased either with respect to the connecting lines.

The present invention also relates to a process for capacitance measurement using the above described device. Preferably, the switching means is controlled by a microprocessor according to a control program stored in the microprocessor itself or in a memory component.

Moreover, the present invention relates to a means for determining the level of a liquid in a container, with the device described above. In an evaluation means downstream of the actual measurement means, the measured capacitance is thereby compared to the stored reference values. These reference values can be fixed and invariable, or reference values can be stored depending on the application, especially depending on the respective liquid. Optionally, the reference values depend on the signals of the other sensors, such as especially of the temperature. The stored reference values can furthermore be adapted according to a given algorithm to the current actual boundary conditions, such as, for example, the temperature or viscosity of the liquid.

Preferably, the electrodes are arranged in succession on the support with such means in the immersion direction. When the level is determined, the individual electrodes are initially classified into "immersed", "not immersed" and "partially immersed" in a first step using the stored reference values or fixed expected values. The result of this classification delivers discrete values, for example, "0" for "not immersed", "1" for "partially immersed", and "2" for "immersed".

An interpolation step then takes place for determining the level in the area of the partially immersed electrode. The accuracy attainable in this second, more or less analogous determination step depends on the height h of the individual electrodes in the immersion direction, and on the characteristic of the capacitance over level.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 2 is an enlarged schematic diagram of the arrangement of the electrodes of FIG. 1;

FIG. 3 is a graph showing the characteristics of the measured capacitance against ground over level of the device of FIG. 1;

FIG. 4 is an enlarged schematic diagram of the lower end of the support of the device of FIG. 1;

FIG. 5 is a schematic diagram of an electrode arrangement according to a second embodiment of the present invention; and FIG. 6 is a graph showing characteristics of the measured capacitance against ground over level for the device of FIG. 5.

DETAILED DESCRIPTION OF THE INVENTION

Figure 1:
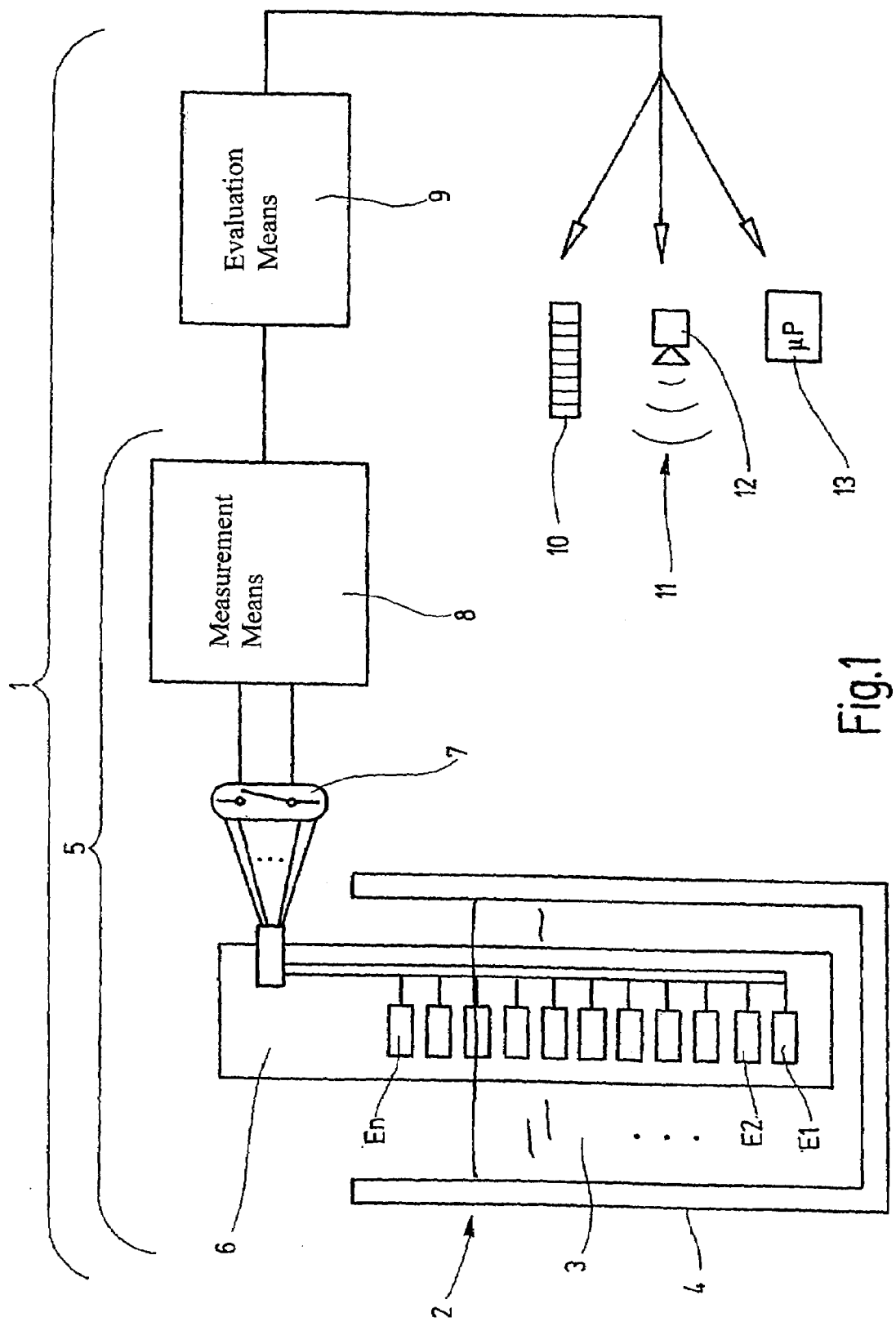
FIG. 1 is a simplified schematic diagram of a capacitance measuring device according to a first embodiment of the present invention.

FIG. 1 shows in a simplified representation a means 1 according to an embodiment of the present invention for determining the level 2 of a liquid 3 in a container 4 with the device 5. The device 5, according to an embodiment of the present invention, measures the capacitance with an electrode arrangement having a plurality of electrodes E1 to En arranged in succession on a support 6. The device 5 furthermore has its own measurement means 8 for measurement of the capacitance between the first electrode E2 as the measurement electrode and the second electrode E1 as the counterelectrode. Also, the device 5 has a controllable switching means 7 for connection of the electrodes E1 to En as the first and second electrodes E2 and E1 to the measurement means, which connection can be switched in a definable manner.

The means 1 for determining the level 2 of liquid 3 furthermore comprises an evaluation means 9 downstream of the measurement means 8. Evaluation means 9 determines the level 2 from the capacitance measured by the device 5 by comparison to stored reference values. This level 2 can be output and relayed from the evaluation means 9 in optional, different ways, for example, using a digital display 10, voice output or a warning signal 11 by means of a speaker 12, or for further processing to a control unit 13.

The controllable switching means 7, the measurement means 8 and the evaluation means 9 are preferably integrated in a microcontroller or microprocessor, especially in a single semiconductor chip, including a memory for reference capacitance values and for the control program.

FIG. 2 shows in an enlargement the arrangement of the electrodes E1 to En. For reasons of clarity, the support 6 is not shown. All electrodes E1 to En are arranged in a rectangular shape, and are parallel to their longitudinal sides in succession on the support 6. The lower edges of the electrodes E1 to En are marked with level heights h1 to hn. The distance between any two adjacent electrodes E1 to En is a constant h. The connecting lines L1 to Ln to the individual electrodes E1 to En are routed up to the measurement electronics, first in particular to the switching means 7. Other connecting lines 14 extend parallel thereto. Other sensors located on the support 6 can make contact with them, for example, a temperature sensor 15 on the bottom end in the vicinity of the lowermost electrode E1.

In one preferred embodiment, the electrodes E1 to En and the connecting lines L1 to Ln are attached to a so-called flex conductor film, i.e., to a very flexible thin substrate. The flex conductor film is located in an electrically insulating tube which preferably is formed of a material with a dielectric constant with a low temperature coefficient, such as, for example, polypropylene.

The measurement means 8 determines the capacitance between the respective first electrode E2 used as the measurement electrode, and at least one other electrode E1 positioned at the ground potential of the measurement means 8. In one special embodiment, all the other electrodes, which are not switched as a measurement electrode, are switched to ground potential by the switching means 7.

Preferably, however the electrode which is adjacent to the first electrode E2, especially adjacent underneath, is switched as the second electrode E1. Furthermore, the liquid 3 and/or, at any rate, one wall of the container 4 is also connected to the reference potential, especially connected to ground.

The capacitance of the electrodes E1 to E5 which are completely or partially immersed and which are located below the level 2 for liquids with a dielectric constant of more than one is greater at any rate than the capacitance of the electrodes E6 to En which are located above the level 2. The level 2 is determined from the measured capacitances.

The determination of the level 2 takes place in two stages. First, the electrodes E1 to E4 are classified into "immersed", electrodes E6 to En are classified into "not immersed", and electrode E5 is classified into "partially immersed". Then, if necessary, interpolation can be done using the capacitance value which is measured for the electrode E5 so that the exact level can be determined in the area of the partially immersed electrode E5.

FIG. 3 shows the characteristic of the measured capacitance against ground over level. The difference of the capacitance value between the "not immersed" state and the "immersed" state of the electrode E1 to E5 in this embodiment is approximately 2 pF at a base capacitance of approximately 150 pF. In addition to the geometrical electrode arrangement, this capacitance difference is of course dependent mainly on the dielectric constant of the liquid. In polar liquids, such as water, it is greater than in essentially nonpolar liquids such as oil. The characteristic of the change of capacitance in all electrodes due to the symmetrical arrangement is essentially identical, and is marked by an almost linear average ascent, the start and end of which are rounded as a result of edge effects.

FIG. 4 shows in an enlargement the lower end of the support 6. In this embodiment, support 6 is made as a flex conductor film which is placed in an electrically insulating tube 16. On the lower closed end, the tube 16 has an electrical plug connection 17 for electrical connection of other sensors, for example, a viscosity sensor.

To increase the measurement accuracy at a given total length of the level sensor, the height h of the electrodes must be reduced. The number of electrodes would thus be increased, by which the number of signal lines L1 to Ln and also the interconnection cost would be increased.

FIG. 5 shows one alternative embodiment of the electrode arrangement of the device according to the present invention. Five individual electrodes E1 to E5 are divided into two component segments E1', E1", . . . to E5', E5". In this way, the capacitance is increased between the respective measurement electrode and the ground potential in several component stages, in this embodiment in two respective component stages. Interpolation in the second step of signal evaluation thus becomes more accurate.

The illustrated embodiment shows a total of five electrodes which are divided into two segments of the same size. Any other division is conceivable, for example, four electrodes can be divided into three respective component segments, six electrodes can be divided into four respective component segments, etc. The connecting lines of the respective component segments are connected to one another hard-wired directly on the support 6.

In this embodiment, the electrode E1 can still make contact with the two component segments E1', E1" using a single connecting line 11. The component segments E1' and E1" of the first electrode are interconnected hard-wired to form a first electrode group. This hard-wiring of the electrode groups, of which there are a total of five in this illustrated embodiment, takes place preferably both with respect to the number of electrodes combined in one group and also with respect to the relative position of the electrodes combined in one group relative to the overall electrode arrangement. The assignment of the measured capacitance value, which is to be undertaken by the means 1 for determining the level 2, to a resulting level 2 is well-defined. Ambiguities, in particular, are avoided.

FIG. 6 shows the characteristic of the measured capacitance against ground over level for the embodiment of FIG. 5. Observation of the current increase of the capacitance of an individual electrode E1 to E5 generally does not yield unambiguous information about the number of immersed component segments E1' to E5". It is therefore advantageous to first undertake classification into "immersed", "partially immersed", and "not immersed' for all electrodes E1 to En. This classification takes place preferably in that the capacitance values for "not immersed" are known or have been determined beforehand and stored. After classification of all electrodes has taken place, unambiguous assignment of the measured capacitance values to a level 2 is possible.

While various embodiments have been chosen to illustrate the invention, it will be understood by those skilled in the art that various changes and modifications can be made therein without departing from the scope of the invention as defined in the appended claims.

What is claimed is:

1. A device for measuring capacitance, comprising:
    a support;
    an electrode arrangement formed of a plurality of electrodes located one of next to one another and in succession on said support;
    actual measurement means for measuring capacitance between a first one of said electrodes as a measurement electrode and a second one of said electrodes as a counterelectrode; and
    a controllable switching means for connecting said electrodes as said first and second ones of said electrodes to said measurement means, for switching in a definable manner and for being controlled by said switching means, each of said electrodes being switchable in alternation as said measurement electrode and another one of said electrodes being switchable as said counterelectrode to a definable reference potential, all of said electrodes which are not switched as the measurement electrode are switched as the counterelectrode to the reference potential.

2. A device according to claim 1 wherein
    the definable reference potential is a ground potential of said measurement means.

3. A device according to claim 1 wherein
    all of said electrodes have essentially identical contours and surface areas.

4. A device according to claim 1 wherein
    each of said electrodes is spaced essentially equally distant from an adjoining one of said electrodes.

5. A device according to claim 1 wherein
    said electrodes that are not directly adjacent to one another are interconnected by wiring into respective electrode groups; and
    said switching means controls one of said electrode groups for switching in alternation as the measurement electrode and the other electrode groups as the counterelectrode to the reference potential.

6. A device according to claim 1 wherein
    said electrodes, along with printed conductors, are applied to said support in thin film technology.

7. A device according to claim 1 wherein
    said electrodes, along with printed conductors, are applied to said support in thick film technology.

8. A device according to claim 1 wherein
    said support comprises connecting means for connection of at least one of other sensors and said switching means.

9. A device according to claim 1 wherein
    said switching means and said measurement means are integrated in a microprocessor.

10. A device according to claim 9 wherein
    said microprocessor comprises a downstream evaluator.

11. A process for measuring capacitance, comprising the steps of:
    arranging a plurality of electrodes located one of next to one another and in succession on a support;
    measuring capacitance between a first one of said electrodes as a measurement electrode and a second one of said electrodes as a counterelectrode with actual measurement means;
    connecting said electrodes as the first and second ones of said electrodes to the measurement means by a controllable switching means; and
    operating and controlling said switching means in a definable manner such that each of the electrodes is switched in alternation as the measurement electrode and another one of said electrodes as the counterelectrode to a definable reference potential and such that all of said electrodes not switched as the measurement electrodes are switched as the counterelectrode to the reference potential.

12. A process according to claim 11 wherein
    the switching means is controlled by a microprocessor according to a stored program.

13. A device for determining a level of a liquid in a container, comprising:
    a support;
    an electrode arrangement formed of a plurality of electrodes located one of next to one another and in succession on said support;
    actual measurement means for measuring capacitance between a first one of said electrodes as a measurement electrode and a second one of said electrodes as a counterelectrode;
    a controllable switching means for connecting said electrodes as said first and second ones of said electrodes to said measurement means, for switching in a definable manner and for being controlled by said switching means, each of said electrodes being switchable in alternation as said measurement electrode and another one of said electrodes being switchable as said counterelectrode to a definable reference potential, all of said electrodes which are not switched as the measurement electrode are switched as the counterelectrode to the reference potential; and
    an evaluation means, downstream of said actual measurement means, for determining the level from capacitance measured by comparison to stored reference values.

14. A device according to claim 13 wherein
    at least one of the liquid and walls of the container are at a reference potential.

15. A device according to claim 13 wherein
    said electrodes that are not directly adjacent to one another are interconnected by wiring into respective electrode groups; and
    said switching means controls one of said electrode groups for switching in alternation as the measurement electrode and the other electrode groups as the counterelectrode to the reference potential.

16. A device according to claim 15 wherein
    said electrode groups are interconnected with respect to a number of electrodes in the respective groups and with respect to relative positions of said electrodes combined in one of said groups relative to an arrangement of all of said electrodes; and
    whereby assignment of measured capacitance values determines the level unambiguously.

17. A device according to claim 13 wherein
    said electrodes are located on an inner side of a tube immersible into the liquid.

18. A device according to claim 17 wherein
    said tube has a side facing the liquid with a coating at least partially over a surface area thereof.

19. A device according to claim 17 wherein
    said tube has a side facing the liquid with a coating over an entire surface area thereof.

* * * * *